United States Patent
Rich et al.

(10) Patent No.: US 11,578,870 B2
(45) Date of Patent: Feb. 14, 2023

(54) SYSTEMS AND METHODS FOR SPRAYING FUEL IN AN AUGMENTED GAS TURBINE ENGINE

(71) Applicant: General Electric Company, Schenectady, NY (US)

(72) Inventors: Brett A. Rich, Edgewood, KY (US); Michael A. Benjamin, Cincinnati, OH (US); Nicholas R. Overman, Sharonville, OH (US); Aaron J. Glaser, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/860,990

(22) Filed: Jul. 8, 2022

(65) Prior Publication Data
US 2022/0349581 A1    Nov. 3, 2022

Related U.S. Application Data

(63) Continuation of application No. 17/166,477, filed on Feb. 3, 2021, now Pat. No. 11,408,610.

(51) Int. Cl.
*F02K 3/10*    (2006.01)
*F23R 3/20*    (2006.01)
*F23R 3/28*    (2006.01)

(52) U.S. Cl.
CPC .................. *F23R 3/20* (2013.01); *F02K 3/10* (2013.01); *F23R 3/28* (2013.01)

(58) Field of Classification Search
CPC ...... F23R 3/18; F23R 3/20; F02K 3/08; F02K 3/10; F02K 3/105; F02K 3/11
See application file for complete search history.

(56) References Cited

U.S. PATENT DOCUMENTS

| | | | |
|---|---|---|---|
| 2,799,991 A * | 7/1957 | Conrad | F23R 3/20 60/749 |
| 3,800,530 A * | 4/1974 | Nash | F02C 7/264 60/761 |

(Continued)

FOREIGN PATENT DOCUMENTS

| | | |
|---|---|---|
| CN | 107270328 | 10/2017 |
| EP | 2644997 | 10/2013 |

(Continued)

OTHER PUBLICATIONS

French Application No. FR2112278, Filed Nov. 19, 2021, Title: Module for Assembling a Fan Blade of a Turbomachine, (Ref. B-024469).

(Continued)

*Primary Examiner* — William H Rodriguez
(74) *Attorney, Agent, or Firm* — Fitch, Even, Tabin & Flannery LLP

(57) ABSTRACT

In some embodiments, systems, apparatuses and methods are provided herein useful for spraying fuel in an augmented gas turbine engine. The embodiments may include a spray bar with a fuel injection aperture configured to inject a fuel jet into a fuel conduit; the fuel conduit having a fuel window to discharge the fuel jet into a core exhaust flow of an augmented gas turbine engine; a first channel directing a first air stream into the fuel conduit; and a second channel directing a second air stream into the fuel conduit. The first air stream and the second air stream cooperatively shape the fuel jet coming out of the fuel window.

20 Claims, 13 Drawing Sheets

(56) References Cited

U.S. PATENT DOCUMENTS

| | | | |
|---|---|---|---|
| 3,893,297 | A | 7/1975 | Tatem, Jr. |
| 3,974,646 | A | 8/1976 | Markowski |
| 4,280,324 | A * | 7/1981 | Arliguie .................. F02C 7/00 60/764 |
| 4,798,048 | A | 1/1989 | Clements |
| 4,887,425 | A | 12/1989 | Vdoviak |
| 5,212,945 | A | 5/1993 | Habrard |
| 5,297,391 | A | 3/1994 | Roche |
| 5,341,645 | A | 8/1994 | Ansart |
| 5,396,761 | A | 3/1995 | Woltmann |
| 5,813,221 | A * | 9/1998 | Geiser ..................... F23R 3/20 60/762 |
| 6,112,516 | A | 9/2000 | Beule |
| 6,125,627 | A | 10/2000 | Rice |
| 7,467,518 | B1 | 12/2008 | Vermeersch |
| 7,574,866 | B2 | 8/2009 | Roche |
| 17,166,477 | | 2/2021 | Rich |
| 2005/0262847 | A1* | 12/2005 | Koshoffer ................ F23R 3/20 60/761 |
| 2009/0056340 | A1* | 3/2009 | Woltmann ................ F23R 3/12 60/765 |
| 2010/0050643 | A1 | 3/2010 | Snyder |
| 2012/0297777 | A1 | 11/2012 | Poyyapakkam |
| 2014/0338357 | A1 | 11/2014 | Lovett |
| 2014/0360197 | A1 | 12/2014 | Tanaka |
| 2016/0033135 | A1 | 2/2016 | Chen |
| 2016/0146468 | A1 | 5/2016 | Gao |
| 2019/0072277 | A1* | 3/2019 | Ruberte Sanchez ...... F02K 3/10 |

FOREIGN PATENT DOCUMENTS

| | | |
|---|---|---|
| EP | 3078913 | 10/2016 |
| EP | 3584501 | 12/2019 |

OTHER PUBLICATIONS

French Application No. FR2109526, Filed Sep. 10, 2021, Title: Flexibilities in a geared gas turbine engine, (Ref. B-024242).

French Application No. FR2109530, Filed Sep. 10, 2021, Title: Flexibilities in a geared gas turbine engine, (Ref. B-024243).

French Application No. FR2109787, Filed Sep. 17, 2021, Title: Aircraft Turbine Engine With an Off-Axis Propeller, (Ref. B-024794).

French Application No. FR2112280, Filed Nov. 19, 2021, Title: Assembly With Variable Setting for a Fan of a Turbomachine, (Ref. B-024468).

French Application No. FR2112486, Filed Nov. 25, 2021, Title: Electric Energy Conversion and Transport System for the Internal Hybridization of an Aircraft Turboengine, (Ref. B-025286).

French Application No. FR2112509, Filed Nov. 25, 2021, Title: Device for Pressurizing a Turbomachine Enclosure With Acurvic Coupling Passage, and Corresponding Turbomachine, (Ref. B-0250350).

French Application No. FR2112705, Filed Nov. 30, 2021, Title: Turbomachine Comprising a Lubrication Enclosure and a Speed Reducer, (Ref. B-024542).

French Application No. FR2112869, Filed Dec. 2, 2021, Title: Turbine engine comprising an electric machine downstream from a turbine shaft and driven by this shaft, (Ref. B-025037).

French Application No. FR2113100, Filed Dec. 7, 2021, Title: Cooling-air distribution case, (Ref. B-024474).

French Application No. FR2113361, Filed Dec. 13, 2021, Title: Turbomachine for an Aircraft Comprising an Electric Machine, (Ref. B-025039).

French Application No. FR2113552, Filed Dec. 15, 2021, Title: Method for managing the torque of a turbomachine, (Ref. B-025059).

French Application No. FR2113845, Filed Dec. 17, 2021, Title: Aircraft Turbomachine, (Ref. B-025396).

French Application No. FR2113847, Filed Dec. 17, 2021, Title: Aircraft Turbomachine, (Ref. B-025189).

French Application No. FR2113949, Filed Dec. 20, 2021, Title: Turbomachine Module Equipped With a Pitch Change System and a Fluid Transfer Device, (Ref. B-024662).

French Application No. FR2113951, Filed Dec. 20, 2021, Title: Turbomachine Module Equipped With Variable Pitch Vanes and an Annular Interface Shroud, (Ref. B-023792).

French Application No. FR2113952, Filed Dec. 20, 2021, Title: Turbomachine Module Equipped With Variable Pitch Vanes and Oil Transfer Device, (Ref. B-023793).

French Application No. FR2113953, Filed Dec. 20, 2021, Title: Turbomachine Module Equipped With a Pitch Change System and a Fluid Transfer Device With Blind Sleeving, (Ref. B-024657).

French Application No. FR2113966, Filed Dec. 20, 2021, Title: Fluid Transfer Device With Hydraulic and Mechanical Connection Means, (Ref. B-024661).

French Application No. FR2114236, Filed Dec. 22, 2021, Title: Turbine Engine Subassembly Including a Gooseneck With an Improved Configuration and Turbine Engine Including a Subassembly of This Type (Ref. B-024601).

French Application No. FR2114272, Filed Dec. 22, 2021, Title: Aircraft Turbine Engine Comprising Blade Pitch Control Using Local Pressure Measurements, (Ref. B-024494).

French Application No. FR2200883, Filed Feb. 1, 2022, Title: Method for managing the torque of a turbomachine, (Ref. B-025105).

French Application No. FR2201260, Filed Feb. 14, 2022, Title: Propulsion unit for aircraft comprising a gas turbine engine and an electrical machine mounted in an enclosure with a cooling system comprising a main coupling member, method for using such a unit, (Ref. B-025173).

French Application No. FR2201266, Filed Feb. 14, 2022, Title: Gas turbine engine assembly comprising a housing with half-shells bearing variable pitch inlet stator vanes, (Ref. B-024190).

French Application No. FR2202171, Filed Mar. 11, 2022, Title: Propulsion System for an Aircraft, (Ref. B-025595).

French Application No. FR2202172, Filed Mar. 11, 2022, Title: Aeronautical Thruster, (Ref. B-025596).

\* cited by examiner

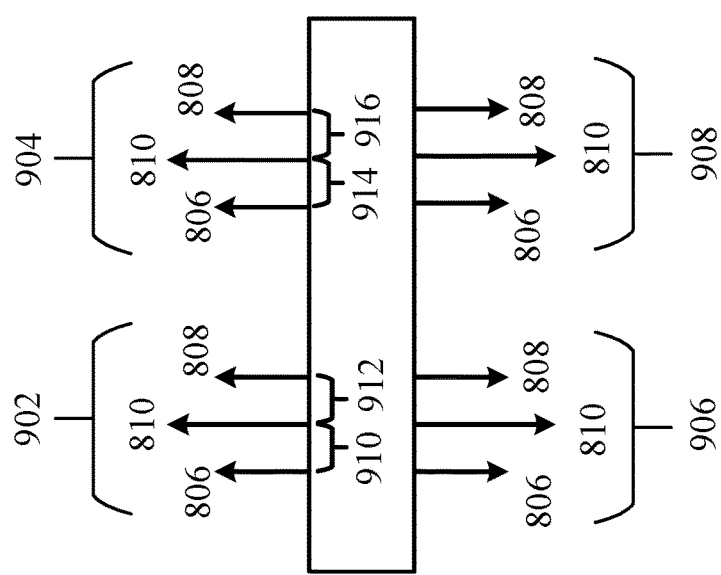
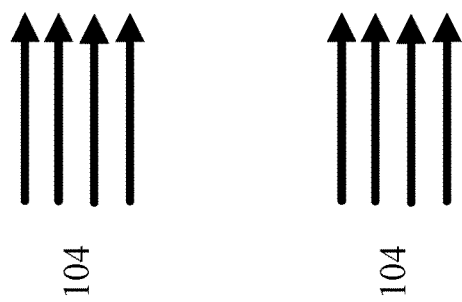
FIG. 9

SYSTEMS AND METHODS FOR SPRAYING FUEL IN AN AUGMENTED GAS TURBINE ENGINE

CROSS-REFERENCE TO RELATED APPLICATION(S)

This application is a continuation of U.S. application Ser. No. 17/166,477 filed Feb. 3, 2021, which is incorporated herein by reference in its entirety.

TECHNICAL FIELD

The technology relates generally to spraying fuel in an augmented gas turbine engine.

BACKGROUND

Generally, augmentor fueling schemes depend on spray bar and fuel system design to achieve both core flow path fuel penetration and dispersion. Generating the required fuel zones to meet objectives for performance is in part a function of what fuel pressure ratio can be set and proximity of spray bars to another. Realizing these goals can affect the weight of the engine by sizing of the fuel pump and spray bar count.

BRIEF DESCRIPTION

Aspects and advantages of the present disclosure will be set forth in part in the following description, or may be obvious from the description, or may be learned through practice of the present disclosure.

In an aspect of the present disclosure, a fuel spray apparatus for spraying fuel in an augmented gas turbine engine includes a spray bar with a fuel injection aperture to inject a fuel jet into a fuel conduit; the fuel conduit having a fuel window to discharge the fuel jet into a core exhaust flow of an augmented gas turbine engine; a first airflow conduit having a first orifice to discharge a first air stream into the core exhaust flow; and a second airflow conduit having a second orifice to discharge a second air stream into the core exhaust flow, where the first orifice and the second orifice are paired with the fuel window to cooperatively shape the fuel jet coming out of the fuel window.

In another aspect of the present disclosure, a system for spraying fuel in an augmented gas turbine engine includes a gas turbine engine having an augmentor portion for burning fuel; and at least one fuel spray bar for spraying fuel within the augmentor portion. In some embodiments, the at least one fuel spray bar includes a first spray bar with a fuel injection aperture to inject a first fuel jet into a first fuel conduit; the first fuel conduit having a first fuel window to discharge the first fuel jet into a core exhaust flow of the augmentor portion; a first airflow conduit having a first orifice to discharge a first air stream into the core exhaust flow; and a second airflow conduit having a second orifice to discharge a second air stream into the core exhaust flow, wherein the first orifice and the second orifice are paired with the first fuel window to cooperatively shape the first fuel jet coming out of the first fuel window.

In another aspect of the present disclosure, a method for spraying fuel in an augmented gas turbine engine includes directing a fuel jet into a core exhaust flow of an augmented gas turbine engine via a fuel window of a fuel conduit configured to receive the fuel jet from a fuel injection aperture of a spray bar; directing a first air stream into the core exhaust flow via a first orifice of a first airflow conduit; and directing a second air stream into the core exhaust flow via a second orifice of a second airflow conduit, wherein the first air stream and the second air stream cooperatively impinge the fuel jet into a shape as the fuel jet comes out of the fuel window.

These and other features, aspects and advantages of the present disclosure and/or embodiments will become better understood with reference to the following description and appended claims. The accompanying drawings, which are incorporated in and constitute a part of this specification illustrate embodiments of the present disclosure and, together with the description, serve to explain the principles of the present disclosure.

BRIEF DESCRIPTION OF THE DRAWINGS

Disclosed herein are embodiments of systems, apparatuses and methods pertaining to spraying fuel in an augmented gas turbine engine. This description includes drawings, wherein:

FIG. 9 is a top-down illustration of an exemplary fuel spray apparatus in accordance with some embodiments;

Figure 1:
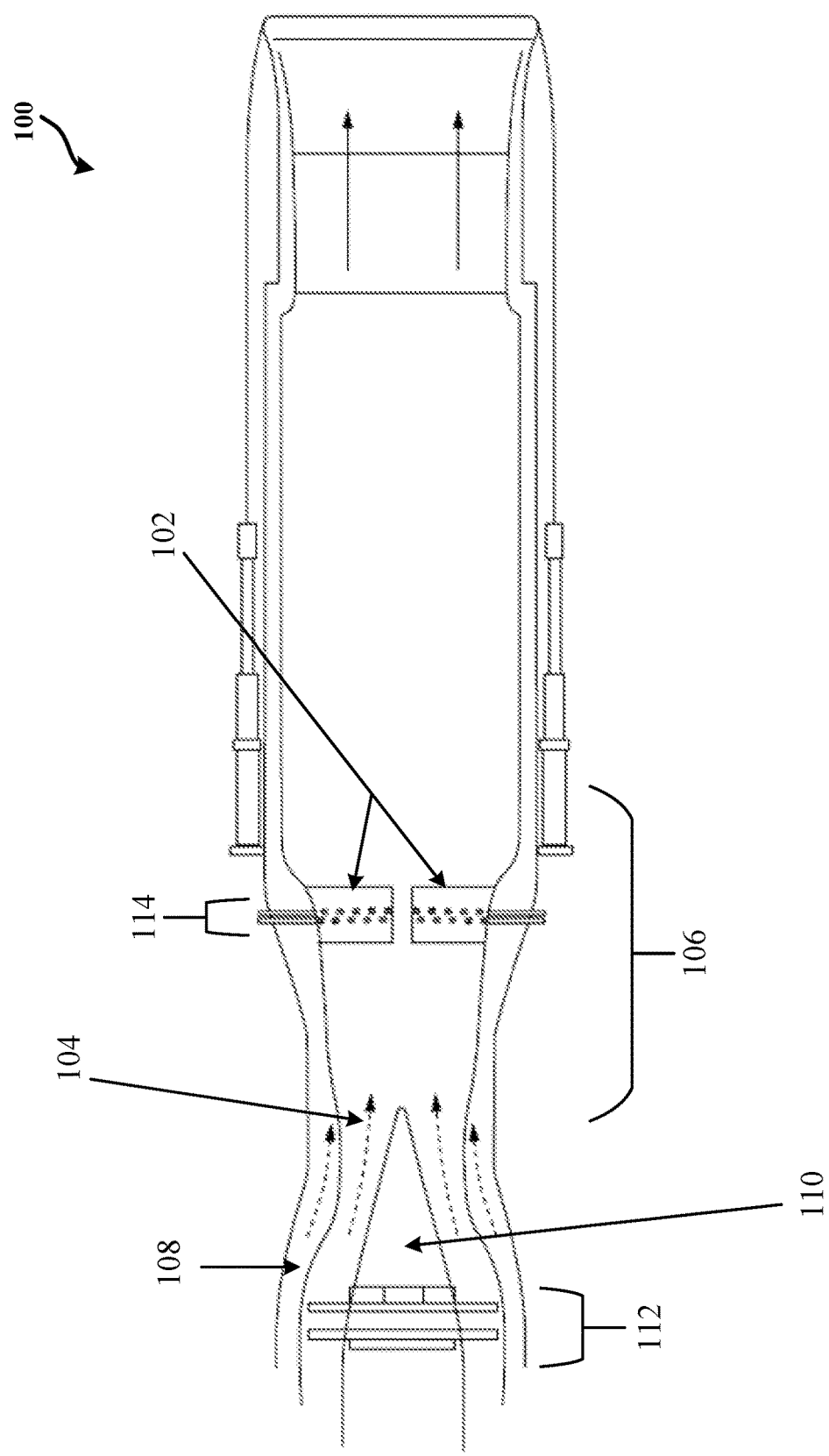
FIG. 1 is a partial cross-sectional illustration of an exemplary augmented gas turbine engine showing exemplary fuel spray apparatuses for spraying fuel in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments. Also, common but well-understood elements that are useful or necessary in a commercially feasible embodiment are often not depicted in order to facilitate a less obstructed view of these various embodiments. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for spraying fuel in an augmented gas turbine engine. In some embodiments, a fuel spray apparatus for spraying fuel in an augmented gas turbine engine includes a spray bar with a fuel injection aperture to inject a fuel jet into a fuel conduit; the fuel conduit having a fuel window to discharge the fuel jet into a core exhaust flow of an augmented gas turbine engine; a first airflow conduit having a first orifice to discharge a first air stream into the core exhaust flow; and a second airflow conduit having a second orifice to discharge a second air stream into the core exhaust flow, where the first orifice and the second orifice are paired with the fuel window to cooperatively shape the fuel jet coming out of the fuel window.

In some embodiments, a system for spraying fuel in an augmented gas turbine engine includes a gas turbine engine having an augmentor portion for burning fuel; and at least one fuel spray bar for spraying fuel within the augmentor portion. In some embodiments, the at least one fuel spray bar includes a first spray bar with a fuel injection aperture to inject a first fuel jet into a first fuel conduit; the first fuel conduit having a first fuel window to discharge the first fuel jet into a core exhaust flow of the augmentor portion; a first airflow conduit having a first orifice to discharge a first air stream into the core exhaust flow; and a second airflow conduit having a second orifice to discharge a second air stream into the core exhaust flow, wherein the first orifice and the second orifice are paired with the first fuel window to cooperatively shape the first fuel jet coming out of the first fuel window.

In some embodiments, a method for spraying fuel in an augmented gas turbine engine includes directing a fuel jet into a core exhaust flow of an augmented gas turbine engine via a fuel window of a fuel conduit configured to receive the fuel jet from a fuel injection aperture of a spray bar; directing a first air stream into the core exhaust flow via a first orifice of a first airflow conduit; and directing a second air stream into the core exhaust flow via a second orifice of a second airflow conduit, wherein the first air stream and the second air stream cooperatively impinge the fuel jet into a shape as the fuel jet comes out of the fuel window.

FIG. 1 is a partial cross-sectional illustration of an exemplary augmented gas turbine engine 100 showing exemplary fuel spray apparatuses 102 for spraying fuel in accordance with some embodiments. In some embodiments, the augmented gas turbine engine 100 includes a center body 110, a fan duct 108, a turbine portion 112, an augmentor portion 106, and one or more fuel spray apparatuses 102 as exemplified in FIG. 1. FIG. 1 generally illustrates the general area where one or more of a fuel spray apparatus 102 may be placed in an augmented gas turbine engine 100. Additionally, the fuel spray apparatus 102 in FIG. 1 is shown in a spray bar configuration. Those skilled in the art will recognize that embodiments of a fuel spray apparatus 102 described herein may be made/manufactured in various shaped configurations (e.g., vane-shaped configurations, heat shield configurations, flame holder configurations). Additionally, those skilled in the art will recognize that embodiments of a fuel spray apparatus 102 described herein may be variously arranged/placed in the augmented gas turbine engine 100 and/or the augmentor portion 106 complimenting the improved fuel zone coverage brought on by the fuel spray apparatus 102 described herein without departing from the scope of the embodiments herein. In some embodiments, core exhaust flow 104 flows from the center body 110 towards the fuel spray apparatus 102 where a fuel stream from the fuel spray apparatus 102 is injected into the core exhaust flow 104 and combusted. In operation, the combustion may be aided by a flame holder (not shown), to provide additional thrust. Those skilled in the art will recognize that other components and/or sections, such as an inlet guide vanes, a fan, a compressor, and a combustion chamber, to name a few, are not shown that are generally included in an augmented gas turbine engine 100.

Figure 2:
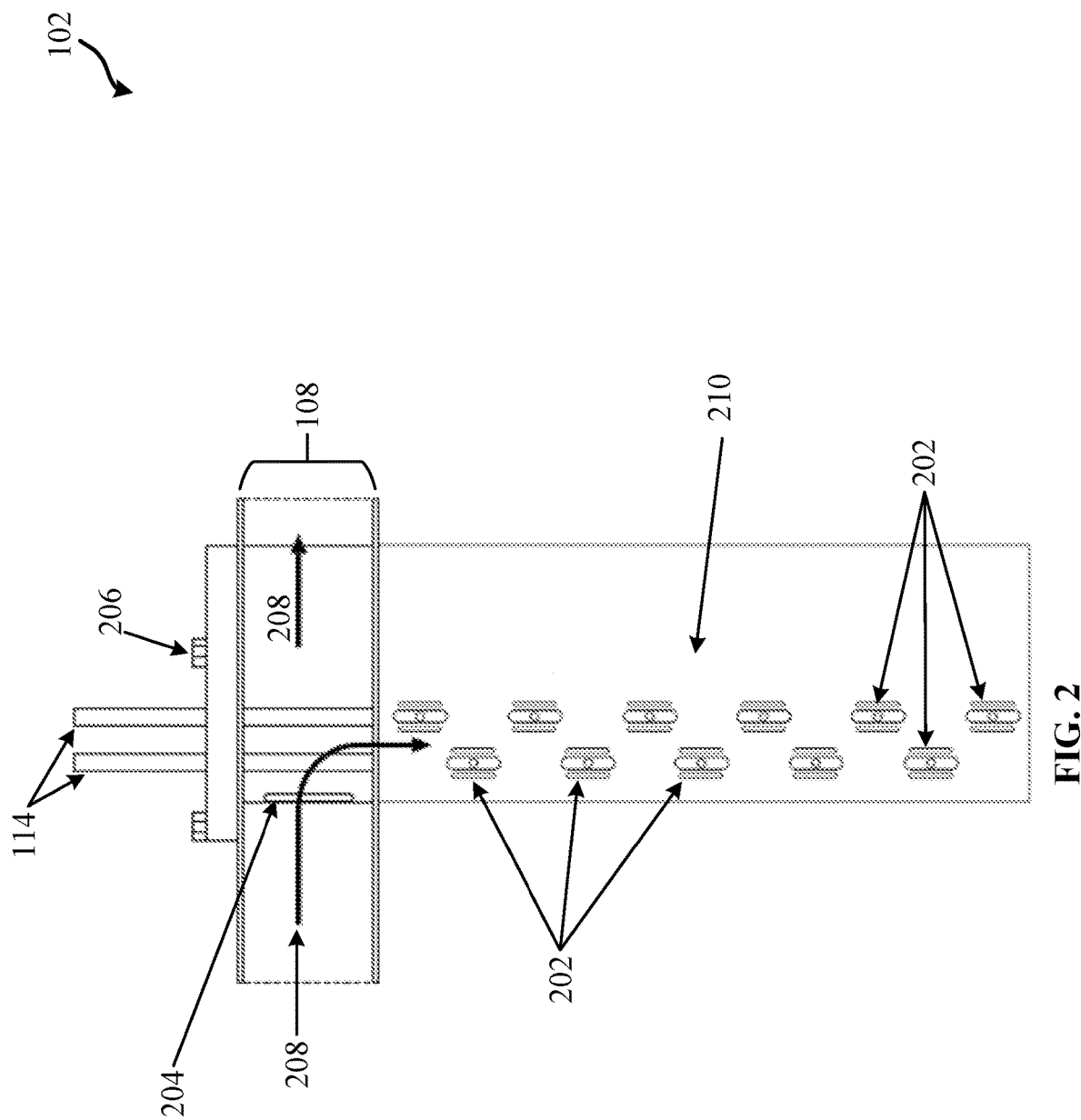
FIG. 2 is a simplified illustration of an exemplary fuel spray apparatus in accordance with some embodiments.

FIG. 2 is a simplified illustration of an exemplary fuel spray apparatus 102 in accordance with some embodiments. In some embodiments, the fuel spray apparatus 102 of FIG. 2 corresponds to the fuel spray apparatus 102 of FIG. 1. In some embodiments, the fuel spray apparatus 102 includes one or more paired fuel window-air orifices 202. A paired fuel window-air orifices 202 includes a fuel window 520 and one or more corresponding air orifices, such as a first orifice 508 and a second orifice 510, as described herein and shown on FIGS. 2, 3, 5-10, and 12. In some embodiments, the fuel spray apparatus 102 includes a heat shield body 210 and the one or more paired fuel window-air orifices 202. For example, the fuel window 520, the first orifice 508, and the second orifice 510 are defined in an external surface of the heat shield body 210 and extend through the fuel conduit 506, the first airflow conduit 516, and the second airflow conduit 518, respectively. In some embodiments, the fuel spray apparatus 102 includes one or more fuel spray inlets 114 to receive fuel discharged by the one or more paired fuel window-air orifices 202. In some embodiments, a portion of the fuel spray apparatus 102 is enclosed in the fan duct 108. In some embodiments, the portion of the fuel spray apparatus 102 enclosed in the fan duct 108 includes at least one fan duct inlet 204 to receive fan air/bypass air 208. In some embodiments, portions of the fan air/bypass air 208 flowing in the fan duct 108 enters the at least one fan duct inlet 204. Remaining portions of the fan air/bypass air 208 flows around the fan duct-enclosed portion of the fuel spray apparatus 102 to continue downstream of the fan duct 108. In some embodiments, the fuel spray apparatus 102 is secured to the fan duct 108 with one or more fasteners 206. Such fasteners may include, for example, bolts used for a flange, nuts, washers, to name a few. The fan air/bypass air 208 flowing inside the fan duct 108 and portions of the one or more fuel spray inlets 114 shown inside the fan duct 108 are depicted as visible in FIG. 2 for illustration purposes. They are enclosed by the heat shield body 210 and generally not visible. Portions of the fuel spray apparatus 102 that are enclosed inside the fan duct 108 are depicted as visible in FIG. 2 for illustration purposes. Once the fuel spray apparatus 102 is fastened to the fan duct 108, this portion of the fuel spray apparatus 102 is generally not visible.

Figure 3:
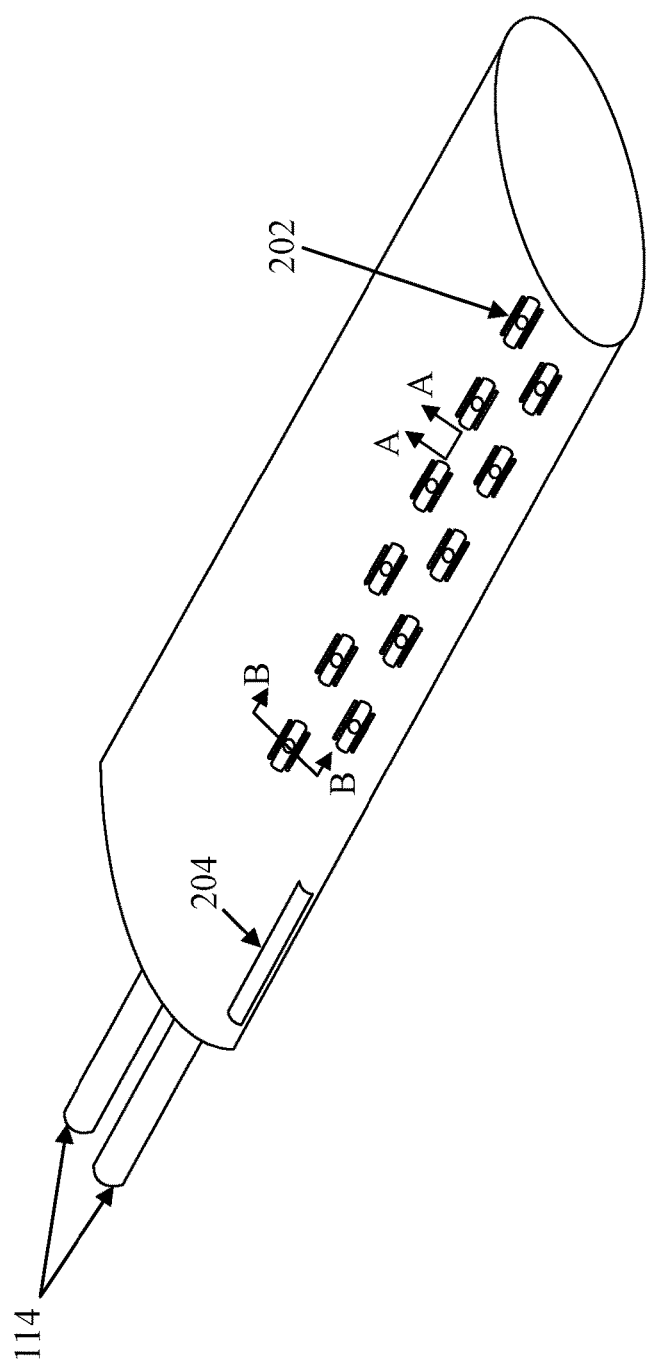
FIG. 3 is a perspective view of an exemplary fuel spray apparatus in accordance with some embodiments.

FIG. 3 is a perspective view of an exemplary fuel spray apparatus 102 in accordance with some embodiments. In some embodiments, the fuel spray apparatus 102 corresponds to the fuel spray apparatus 102 of FIG. 2 and/or the fuel spray apparatus 102 of FIG. 1.

Figure 4:
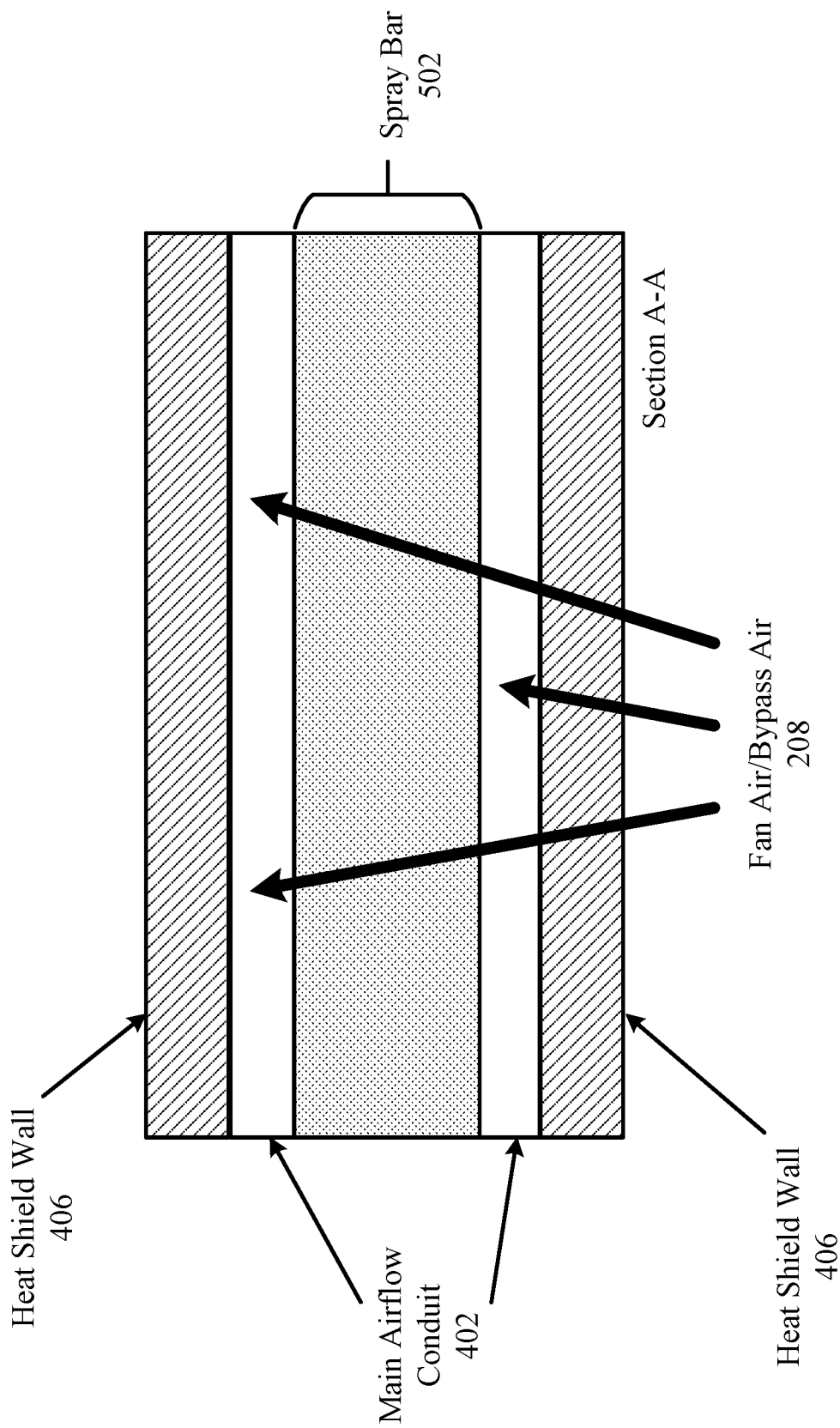
FIG. 4 is a cross-sectional view of the exemplary fuel spray apparatus of FIG. 3 taken along line A-A of FIG. 3 in accordance with some embodiments.
Figure 5:
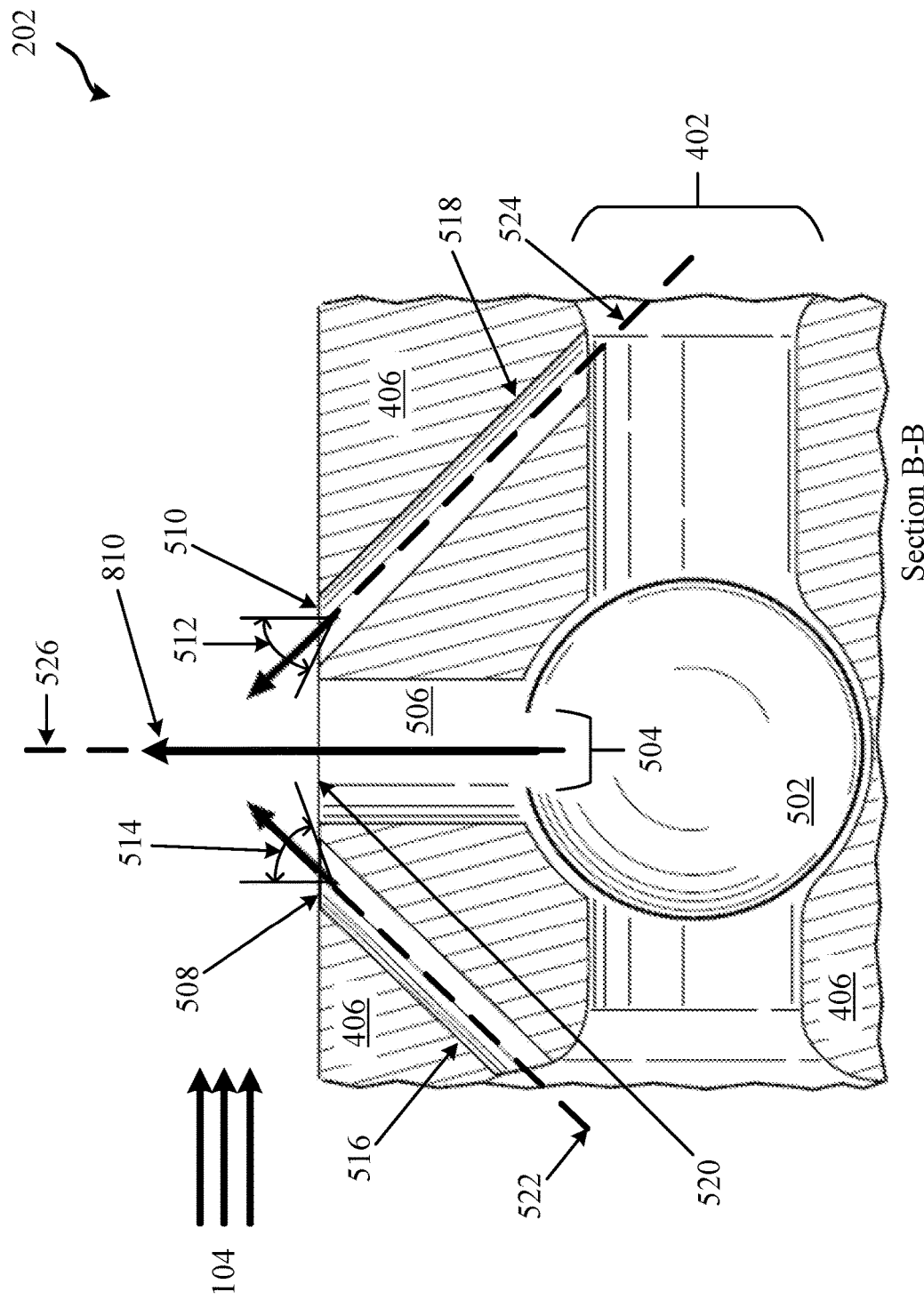
FIG. 5 is a cross-sectional view of an exemplary paired fuel window-air orifices of the exemplary fuel spray apparatus of FIG. 3 as taken along line B-B of FIG. 3 in accordance with some embodiments.

FIG. 4 is a cross-sectional view of the exemplary fuel spray apparatus 102 of FIG. 3 as taken along line A-A of FIG. 3 in accordance with some embodiments. In FIG. 4, the heat shield wall 406 is a top layer forming a surface of the fuel spray apparatus 102. In some embodiments, the heat shield wall 406 provides protection/shielding to one or more spray bars 502 of FIGS. 5-9 of the fuel spray apparatus 102 from the temperature environment inside the augmented gas turbine engine 100. In some embodiments, a main airflow conduit 402 directs the fan air/bypass air 208 to at least partially surround a spray bar 502 that directs fuel to the one or more fuel apertures 504. In some embodiments, the at least one fan duct inlet 204 of FIG. 2 defines an opening to the main airflow conduit 402 that directs the fan air/bypass air 208 to the first airflow conduit 516 and/or the second airflow conduit 518 of FIGS. 5, 6, and 8. In some embodiments, the first airflow conduit 516 and the second airflow conduit 518 are defined from cavities through the heat shield wall 406 that terminate at distal ends proximate to openings to the main airflow conduit 402 as shown in FIG. 5. In some embodiments, the conduits, channels, cavities, openings, orifices of the fuel spray apparatuses 102 described herein are manufactured using one or more types of manufacturing processes (e.g., 3D printing or additive manufacturing, CNC machining, polymer casting, rotational molding, vacuum forming, injection molding, extrusion, and blow molding, to name a few).

FIG. 5 is a cross-sectional view of an exemplary paired fuel window-air orifices 202 of the exemplary fuel spray apparatus 102 of FIG. 3 as taken along line B-B of FIG. 3 in accordance with some embodiments. In some embodiments, a paired fuel window-air orifices 202 includes a spray bar 502 with a fuel injection aperture 504 for injecting a fuel jet into a fuel conduit 506. In some embodiments, the paired fuel window-air orifices 202 includes the fuel conduit 506 having a fuel window 520 to discharge the fuel jet into a core exhaust flow 104 of an augmented gas turbine engine 100. In some embodiments, the paired fuel window-air orifices 202 includes a first airflow conduit 516 having a first orifice 508 to discharge a first air stream into the core exhaust flow 104. In some embodiments, the paired fuel window-air orifices 202 includes a second airflow conduit 518 having a second orifice 510 to discharge a second air stream into the core exhaust flow 104. The first orifice 508 and the second orifice 510 are paired with the fuel window 520 to cooperatively shape the fuel jet coming out of the fuel window 520. At least one of the benefits of shaping the fuel jet as it comes out of the fuel window 520 is to improve fuel zone coverage. Better fuel flow penetration into the core of the augmented gas turbine engine 100 as well as dispersion and atomization of the fuel are achieved by pairing one or more air orifices 508, 510 with the fuel window 520.

For example, in some embodiments, at least one of a first shape of the first orifice 508 or a second shape of the second orifice 510 may include, for example, a circular shape, oval shape, rectangular shape, square shape, triangular shape, and/or trapezoidal shape, among other geometrical shapes. In some embodiments, the first orifice 508 and/or the second orifice 510 may be sized based on a predetermined and/or desired fuel zone coverage, dispersion, and/or atomization of the fuel. In some embodiments, the first orifice 508 and the second orifice 510 are substantially shaped and/or sized similarly and/or equally. In some embodiments, the first orifice 508 and the second orifice 510 are differently and/or distinctively shaped and/or sized. In some embodiments, the first orifice 508 is configured to discharge a first air stream having a first angular range 514. In some embodiments, the second orifice 510 is configured to discharge a second air stream having a second angular range 512. In some embodiments, the first angular range 514 and the second angular range 512 are substantially the same. In some embodiments, the first angular range 514 is different and/or distinct from the second angular range 512. In some embodiments, the first angular range 514 and/or the second angular range 512 comprise an angular range from 20 degrees to 90 degrees. In some embodiments, the first orifice 508 and the second orifice 510 are shaped, sized, and/or configured to have a particular angular range 512, 514 to achieve a predetermined and/or desired fuel zone coverage, dispersion, and/or atomization of the fuel.

In some embodiments, one of the benefits of having the main airflow conduit 402 run along a radial length of the fuel spray apparatus 102 is to cooperatively shape the fuel jet coming out of the fuel window 520. This may be achieved by supplying air to the first airflow conduit 516, the second airflow conduit 518, the first subchannel 802, the third subchannel 804, the second subchannel 602, the fourth subchannel 604, the upstream gap 702, and/or the downstream gap 704. In some embodiments, another benefit of having the main airflow conduit 402 defined along a radial length of the fuel spray apparatus 102 is to remove heat from the fuel spray apparatus 102 as air flows through the fuel spray apparatus 102 and out of the first airflow conduit 516, the second airflow conduit 518, the first subchannel 802, the third subchannel 804, the second subchannel 602, the fourth subchannel 604, the upstream gap 702, and/or the downstream gap 704 as shown and/or described in FIG. 8 below.

In some embodiments, a first centerline 522 of the first airflow conduit 516 is at a first angle relative to a second centerline 526 of the fuel conduit 506. In some embodiments, a third centerline 524 of the second airflow conduit 518 is at a second angle relative to the second centerline 526 of the fuel conduit 506. For example, during the manufacturing process, each of the first airflow conduit 516 and the second airflow conduit 518 along with the first orifice 508 and the second orifice 510 may be formed, molded, machined, and/or printed at a particular angle relative to the second centerline 526 of the fuel conduit 506 to cooperatively shape the fuel jet coming out of the fuel window 520. In some embodiments, each paired fuel window-air orifices 202 in the fuel spray apparatus 102 may be formed, molded, machined, and/or printed based on its location, position, and/or placement relative to the core exhaust flow 104 in the augmented gas turbine engine 100. In some embodiments, the fuel window 520 is approximately equidistant from both the first orifice 508 and the second orifice 510.

In some embodiments, the centerline of the fuel window 520 is approximately equidistant from both centerlines of the first orifice 508 and the second orifice 510. In some embodiments, the first orifice 508 is positioned substantially across from the second orifice 510 relative to the fuel window 520. In one example, the centerlines of the fuel window 520, the first orifice 508, and the second orifice 510 are axially aligned. In some embodiments, a shape of the fuel window 520 may be geometrically shaped (for e.g., a circular shape, oval shape, rectangular shape, square shape, triangular shape, and/or trapezoidal shape, etc.). In some embodiments, the first airflow conduit 516 and the second airflow conduit 518 are configured to receive at least one of bypass air or bleed air of the augmented gas turbine engine. In some embodiments, the bypass air is an air stream from a fan of the augmented gas turbine engine 100 that bypasses the engine core of the augmented gas turbine engine 100. In some embodiments, the bleed air is sourced from a compressor bleed offtake and/or elsewhere on the augmented gas turbine engine 100.

Figure 6:
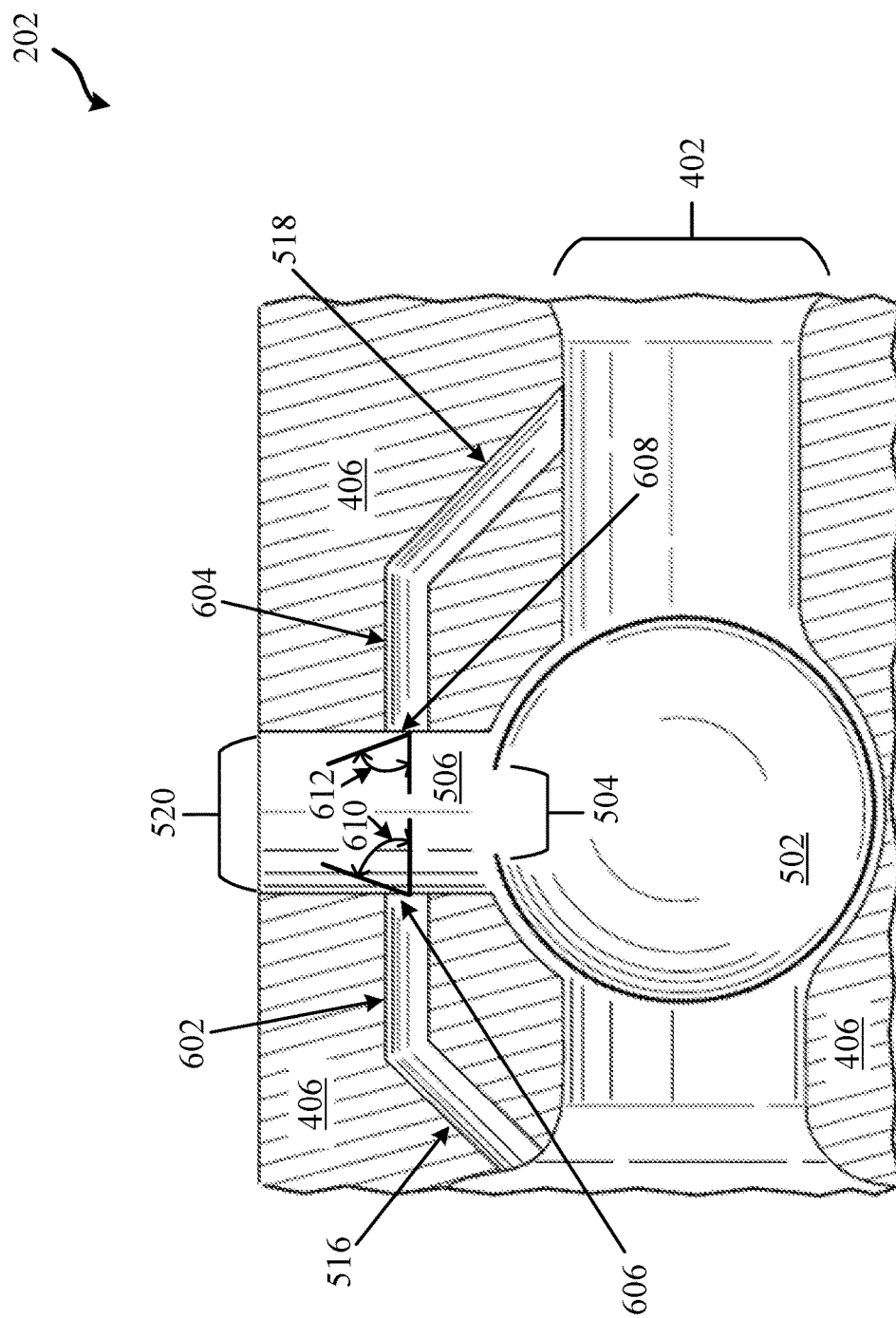
FIG. 6 is a cross-sectional view of an exemplary paired fuel window-air orifices of an exemplary fuel spray apparatus in accordance with some embodiments.
Figure 8:
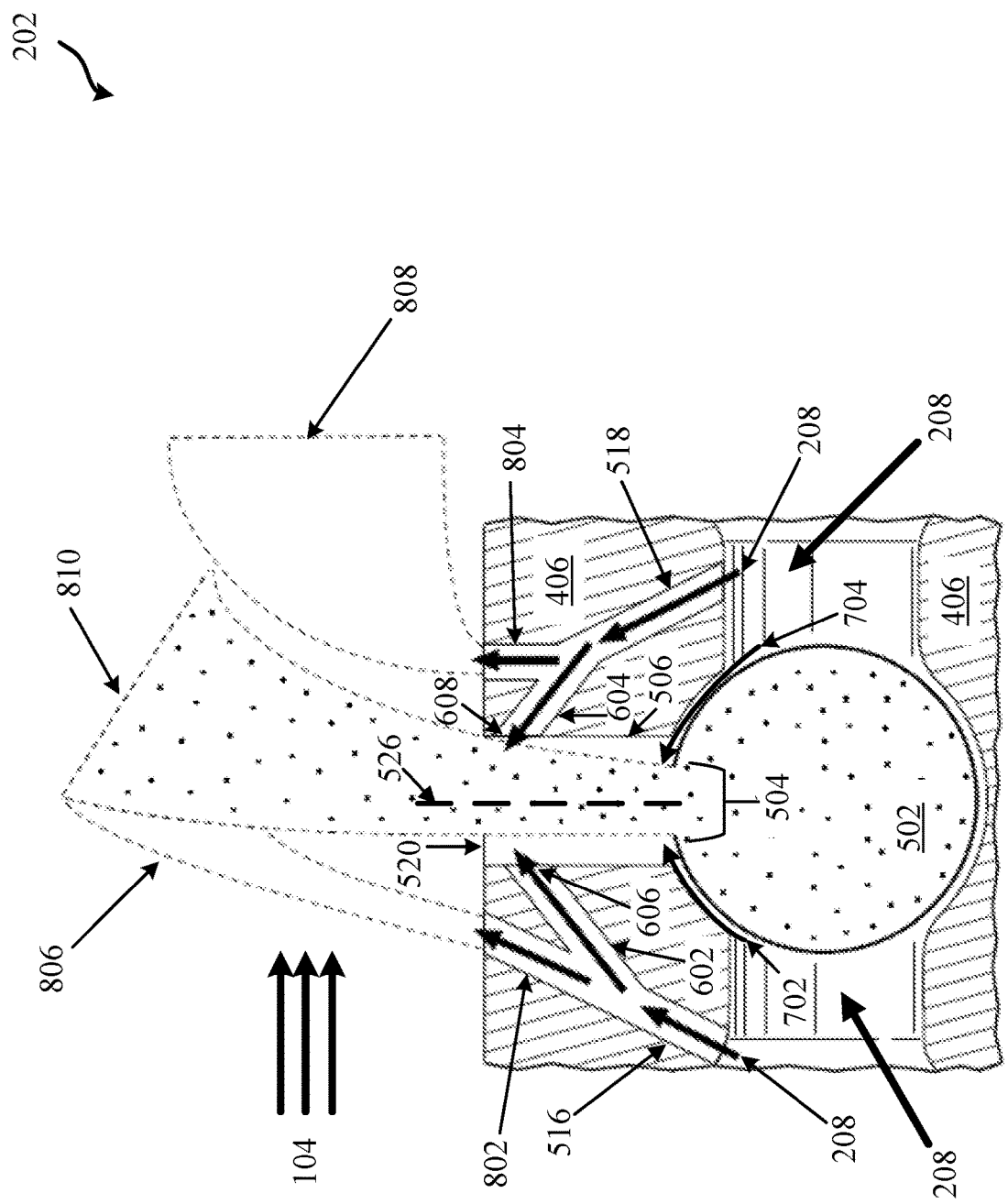
FIG. 8 is a cross-sectional view of an exemplary paired fuel window-air orifices of an exemplary fuel spray apparatus in accordance with some embodiments.

In some embodiments, the corresponding one or more air orifices paired with the fuel window 520 are defined in one or more openings to the fuel conduit 506 as shown in FIG. 6. FIG. 6 is a cross-sectional view of an exemplary paired fuel window-air orifices 202 of an exemplary fuel spray apparatus 102 in accordance with some embodiments. In some embodiments, the first airflow conduit 516 terminates at a distal end proximate a second subchannel 602 terminating at a first opening 606 into the fuel conduit 506. In some embodiments, the second subchannel 602 terminates perpendicularly at the first opening 606 relative to the fuel conduit 506. In some embodiments, the second airflow conduit 518 terminates at a distal end proximate a fourth subchannel 604 terminating at a second opening 608 into the fuel conduit 506. In some embodiments, the fourth subchannel 604 terminates perpendicularly at the second opening 608 relative to the fuel conduit 506. In some embodiments, one or both of the second subchannel 602 and the fourth subchannel 604 terminates at an oblique-angle that allows an air stream to be discharged at an angular range from 0 degrees to 60 degrees at its corresponding opening relative to the fuel conduit 506 as shown in FIG. 8.

In some embodiments, the first opening 606 is configured to discharge an air stream at a third angular range 610. In some embodiments, the second opening 608 is configured to discharge an air stream at a fourth angular range 612. In some embodiments, the third angular range 610 and the fourth angular range 612 are substantially the same. In some embodiments, the third angular range 610 is different and/or distinct from the fourth angular range 612. In some embodiments, the third angular range 610 and/or the fourth angular range 612 comprise an angular range from 0 degrees to 60 degrees, where 0 degrees is perpendicular relative to the fuel conduit 506. The angular range is measured between 0 degrees and 60 degrees. In some embodiments, the first opening 606 and the second opening 608 are shaped, sized, and/or configured to have a particular angular range 610, 612 to achieve a predetermined and/or desired fuel zone coverage, dispersion, and/or atomization of the fuel. In some embodiments, the first opening 606 into the fuel conduit 506 is positioned substantially horizontally across from the second opening 608 into the fuel conduit 506.

Figure 7:
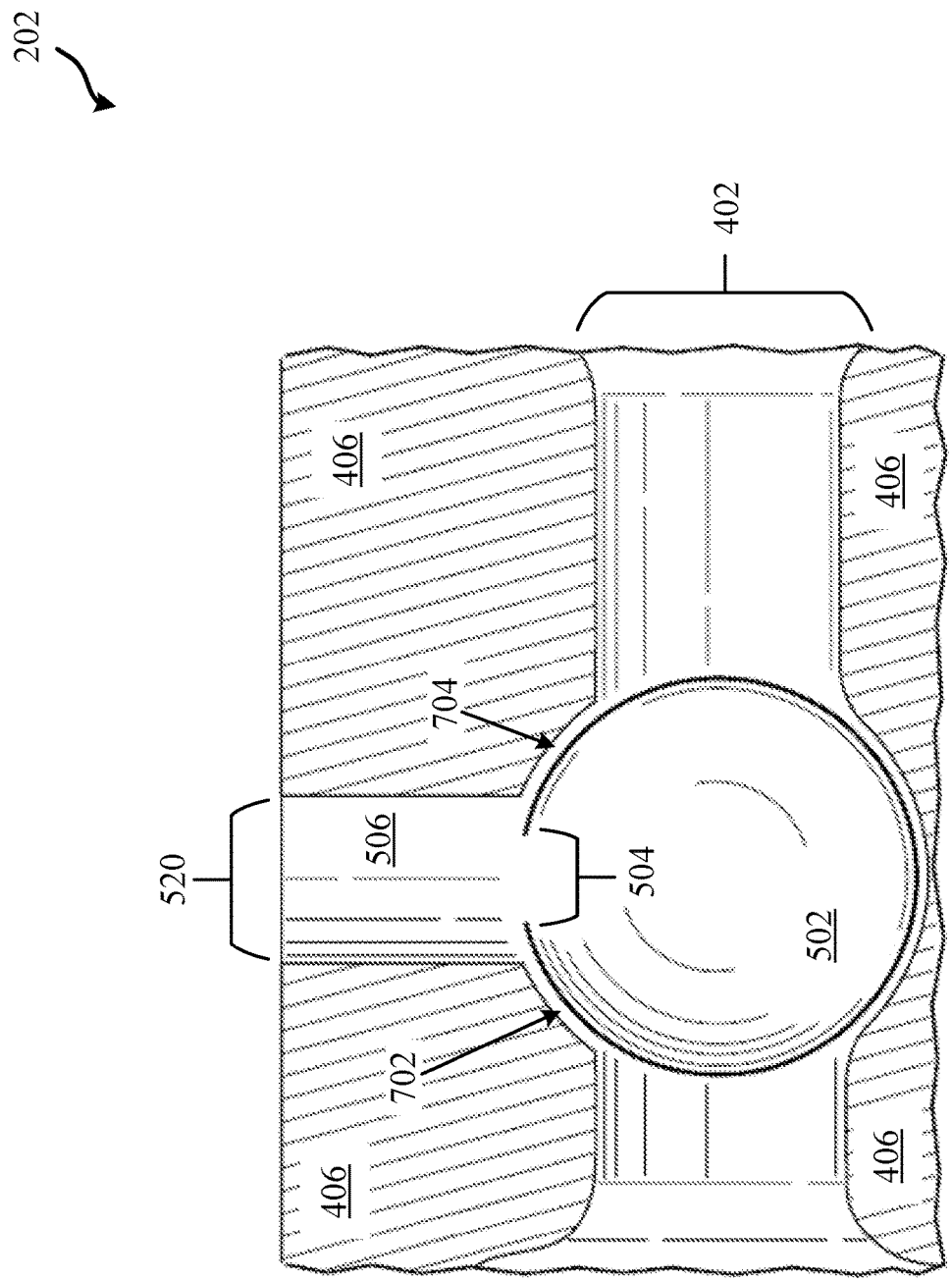
FIG. 7 is a cross-sectional view of an exemplary paired fuel window-air orifices of an exemplary fuel spray apparatus in accordance with some embodiments.

In some embodiments, the corresponding one or more air orifices paired with the fuel window 520 are defined in one or more gaps formed between the heat shield wall 406 and the spray bar 502 as shown in FIG. 7. FIG. 7 is a cross-sectional view of an exemplary paired fuel window-air orifices 202 of an exemplary fuel spray apparatus 102 in accordance with some embodiments. In some embodiments, the heat shield wall 406 at least partially surrounds the spray bar 502 proximate to the fuel injection aperture 504. In some embodiments, the air from the main airflow conduit 402 is directed to flow into an upstream gap 702 and a downstream gap 704 terminating at the fuel conduit 506. In some embodiments, the upstream gap 702 and the downstream gap 704 are formed between the heat shield wall 406 and the spray bar 502 to direct the air that flows through these gaps to cooperatively impinge the fuel jet into a shape as the fuel jet comes out of the fuel injection aperture 504 to the fuel conduit 506 and out of the fuel window 520. In some embodiments, the fan air/bypass air 208 directed through the upstream gap 702 and the downstream gap 704 forms an air curtain exiting the fuel window 520 to shield the fuel jet from the core exhaust flow 104.

In some embodiments, the corresponding one or more air orifices paired with the fuel window 520 includes one or more combination of air orifices shown and/or described in FIGS. 5-7. In an illustrative non-limiting embodiment, the corresponding one or more air orifices paired with the fuel window 520 may be as shown and/or described in FIG. 8. FIG. 8 is a cross-sectional view of an exemplary paired fuel window-air orifices 202 of an exemplary fuel spray apparatus 102 in accordance with some embodiments. In some embodiments, the first airflow conduit 516 splits into a first subchannel 802 and the second subchannel 602. In some embodiments, the first orifice 508 is located at a terminal end of the first subchannel 802 and the second subchannel 602 terminates at the first opening 606 into the fuel conduit 506. In some embodiments, the second airflow conduit 518 splits into a third subchannel 804 and the fourth subchannel 604. In some embodiments, the second orifice 510 is located at a terminal end of the third subchannel 804 and the fourth subchannel 604 terminates at the second opening 608 into the fuel conduit 506. In some embodiments, a centerline of the first subchannel 802 is at an oblique-angle relative to the second centerline 526 of the fuel conduit 506. In some embodiments, a centerline of the third subchannel 804 is parallel relative to the second centerline 526 of the fuel conduit 506. In some embodiments, a centerline of the third subchannel 804 is parallel to the second centerline 526 of the fuel conduit 506.

Figure 12:
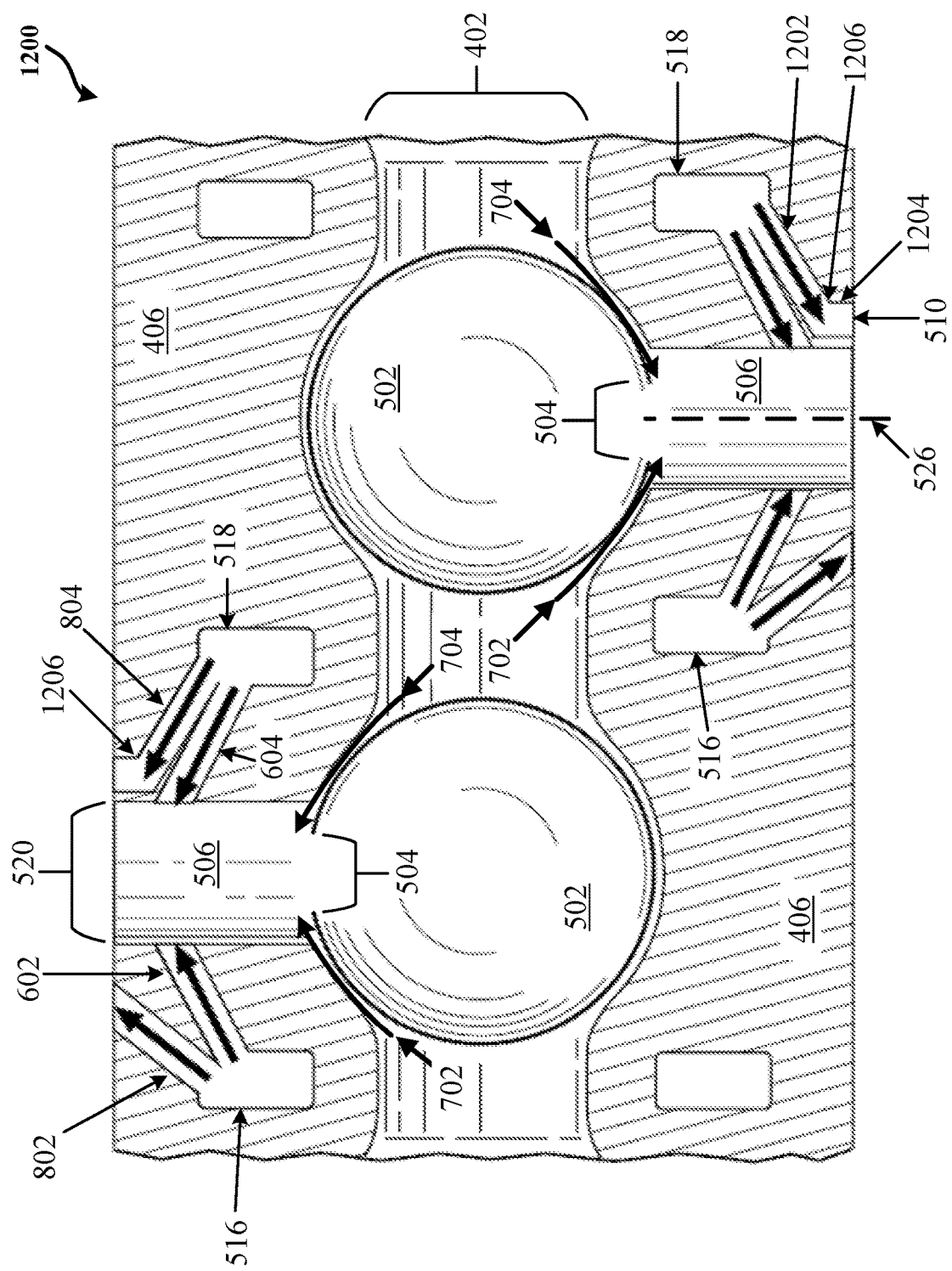
FIG. 12 is a cross-sectional view of an exemplary paired fuel window-air orifices of an exemplary fuel spray apparatus in accordance with some embodiments.
Figure 13:
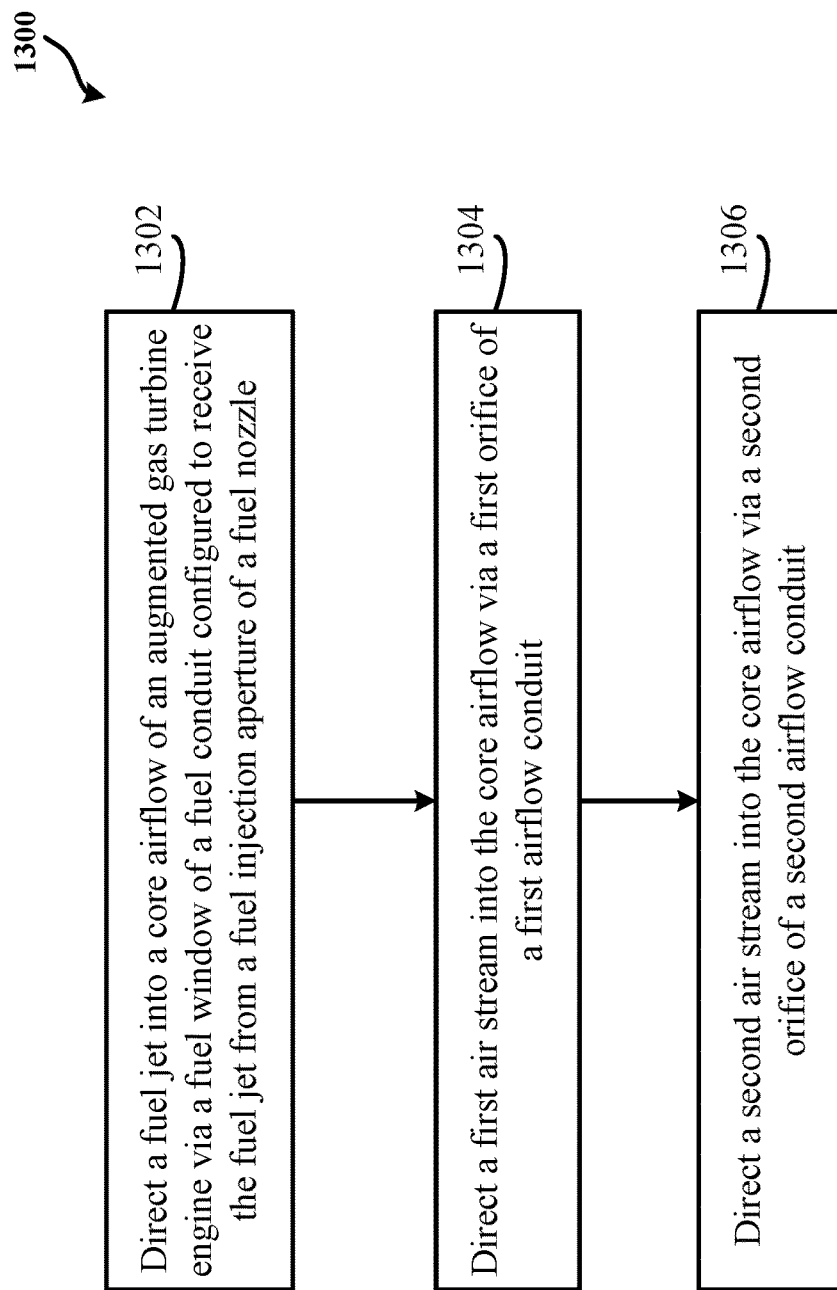
FIG. 13 shows a flow diagram of an exemplary process of spraying fuel in an augmented gas turbine engine in accordance with some embodiments.

To further illustrate, FIG. 8 is described along with an exemplary process/method 1300 shown in FIG. 13. FIG. 13 shows a flow diagram of the exemplary process/method 1300 of spraying fuel in an augmented gas turbine engine 100 in accordance with some embodiments. In some embodiments, the exemplary process/method 1300 is applicable to the paired fuel window-air orifices 202 and/or the fuel spray apparatus 102 shown and/or described in FIGS. 1-12. In some embodiments, the method 1300 includes directing a fuel jet 810 into the core exhaust flow 104 of an augmented gas turbine engine 100 via a fuel window 520 of the fuel conduit 506 configured to receive the fuel jet 810 from the fuel injection aperture 504 of the spray bar 502, at step 1302. In some embodiments, the method 1300 includes directing a first air stream 806 into the core exhaust flow 104 via the first orifice 508, at step 1304. In some embodiments, the main airflow conduit 402 directs the fan air/bypass air 208 to the first airflow conduit 516. In some embodiments, the first subchannel 802 directs portions of the fan air/bypass air 208 out of the first orifice 508 and discharges the first air stream 806 into the core exhaust flow 104. In some embodiments, the first air stream 806 shapes and/or steers downwardly the fuel jet 810, thereby controlling the fuel zone coverage, dispersion, and/or atomization of the fuel in the augmented gas turbine engine 100. In some embodiments, the first air stream 806 shields the fuel jet 810 flow from high momentum core flow (e.g., the core exhaust flow 104) to improve fuel penetration into the core of the augmented gas turbine engine 100. In some embodiments, the method 1300 includes directing a third air stream via the second subchannel 602 of the first airflow conduit 516 through the first opening 606 into the fuel conduit 506. In some embodiments, the third air stream impinges on the fuel jet 810 as the fuel jet 810 comes out of the fuel injection aperture 504. In some embodiments, the third air stream further shapes the upstream side of the fuel jet 810.

In some embodiments, the method 1300 includes directing a second air stream 808 into the core exhaust flow 104 via the second orifice 510, at step 1306. In some embodiments, the main airflow conduit 402 directs the fan air/ bypass air 208 to the second airflow conduit 518. In some embodiments, the third subchannel 804 directs portions of the fan air/bypass air 208 out of the second orifice 510 and discharges the second air stream 808 into the core exhaust flow 104. In some embodiments, the second air stream 808 shapes the fuel jet 810 to control the fuel zone coverage, dispersion, and/or atomization of the fuel in the augmented gas turbine engine 100. In some embodiments, the second air stream 808 builds a film layer that cools the component surface of the fuel spray apparatus 102. In some embodiments, the second air stream 808 provides an air buffer from the fuel sprayed into the freestream and/or the core exhaust flow 104 to abate against distress that generally results from fuel wetting of the component surface and temperature magnitude or gradient.

In some embodiments, the method 1300 includes directing a fourth air stream via the fourth subchannel 604 of the second airflow conduit 518 through the second opening 608 into the fuel conduit 506 to additionally impinge on the fuel jet 810 as the fuel jet 810 comes out of the fuel injection aperture 504. In some embodiments, the method 1300 includes directing at least one of the fan air/bypass air 208 or bleed air of the augmented gas turbine engine 100 into the first airflow conduit 516 and the second airflow conduit 518. In some embodiments, the method 1300 includes directing the fan air/bypass air 208 to flow into the upstream gap 702 and/or downstream gap 704. In some embodiments, the upstream gap 702 and the downstream gap 704 are formed between the heat shield wall 406 and the spray bar 502 to cooperatively impinge the fuel jet 810 into a shape as the fuel jet 810 comes out of the fuel window 520. In some embodiments, the main airflow conduit 402 directs the fan air/bypass air 208 into the first airflow conduit 516 and the second airflow conduit 518.

FIG. 9 is a top-down view illustration of an exemplary fuel spray apparatus 102 in accordance with some embodiments. In some embodiments, the fuel spray apparatus 102 includes a plurality of paired fuel window-air orifices 202. In some embodiments, each of a first paired fuel window-air orifices 902, a second paired fuel window-air orifices 904, a third paired fuel window-air orifices 906, and a fourth paired fuel window-air orifices 908 are variously and/or distinctly configured relative to the others based at least on a predetermined and/or desired fuel zone coverage, dispersion, and/or atomization of the fuel. Variation in each of the plurality of paired fuel window-air orifices 202 can be based on radial groupings, axial groupings, and/or for every air orifice and/or on each design parameter (e.g., directionality, shape, and/or size of air orifices, to name a few, as described herein) of the paired fuel window-air orifices 202. In some embodiments, each of the plurality of paired fuel window-air orifices 202 can be particularly optimized for corresponding fuel window throughout the radial length of the fuel spray apparatus 102. In some embodiments, each orifice of a paired fuel window-air orifices 202 can be offset from the corresponding fuel window to align with the core exhaust flow 104 and/or core flow streamlines. In some embodiments, pairing of a particularly configured air orifices with a particular fuel window for spraying fuel in an augmented gas turbine engine as described herein improves flame holding capability, combustion dynamics, and/or heat release distribution.

In an illustrative non-limiting example, the second orifice 510 associated with the first paired fuel window-air orifices 902 is of a circular shape while the first orifice 508 associated with the second paired fuel window-air orifices 904 is of a square shape. In another illustrative non-limiting example, the first orifice 508 and the second orifice 510 associated with the third paired fuel window-air orifices 906 are both of a circular shape while the first orifice 508 and the second orifice 510 associated with the fourth paired fuel window-air orifices 908 may both of an oblong shape. In some embodiments, each paired fuel window-air orifices 202 on a first side of the fuel spray apparatus 102 is paired with substantially similarly configured paired fuel window-air orifices 202 on an opposite to the first side of the fuel spray apparatus 102 as shown in FIG. 9.

In some embodiments, the plurality of paired fuel window-air orifices 202 are arranged in a fuel spray bar configuration for spraying fuel within the augmentor portion 106. In an illustrative non-limiting example, the first paired fuel window-air orifices 902 includes a spray bar 502 with a fuel injection aperture 504 to inject a first fuel jet into a first fuel conduit 506. In some embodiments, the first paired fuel window-air orifices 902 includes the first fuel conduit 506 having a fuel window 520 to discharge the first fuel jet into a core exhaust flow 104 in the augmentor portion 106. In some embodiments, the first paired fuel window-air orifices 902 includes a first airflow conduit 516 having a first orifice 508 to discharge a first air stream 806 into the core exhaust flow 104. In some embodiments, the first paired fuel window-air orifices 902 includes a second airflow conduit 518 having a second orifice 510 to discharge a second air stream 808 into the core exhaust flow 104. The first orifice 508 and the second orifice 510 are paired with the fuel window 520 to cooperatively shape the first fuel jet coming out of the fuel window 520. In some embodiments, the first orifice 508 is a first distance 910 relative to the fuel window 520 while the second orifice 510 is a second distance 912 relative to the fuel window 520. In some embodiments, the first orifice 508 is located on an upstream side of the fuel window 520 relative to the core exhaust flow 104. In some embodiments, the second orifice 510 is located on a downstream side of the fuel window 520 relative to the core exhaust flow 104.

In another illustrative non-limiting example, the second paired fuel window-air orifices 904 includes a spray bar 502 with a fuel injection aperture 504 to inject a second fuel jet into a fuel conduit 506. In some embodiments, the fuel conduit 506 having a fuel window 520 to discharge the second fuel jet into the core exhaust flow 104. In some embodiments, a first airflow conduit 516 having a first orifice 508 to discharge a third air stream into the core exhaust flow 104 and a second airflow conduit 518 having a second orifice 510 to discharge a fourth air stream into the core exhaust flow 104. In some embodiments, the first orifice 508 and the second orifice 510 are paired with the fuel window 520 to cooperatively shape the second fuel jet coming out of the fuel window 520. In some embodiments, the first orifice 508 is a third distance 914 relative to the fuel window 520 while the second orifice 510 is a fourth distance 916 relative to the fuel window 520.

In another illustrative non-limiting example, the first orifice 508 of the second paired fuel window-air orifices 904 is adjacent to the second orifice 510 of the first paired fuel window-air orifices 902. In some embodiments, the second orifice 510 of the first paired fuel window-air orifices 902 may be configured to discharge the second air stream 808 at a first angular range and the first orifice 508 of the second paired fuel window-air orifices 904 may be configured to discharge the third air stream 806 at a second angular range different from the first angular range. In another illustrative non-limiting example, a first shape of the second orifice 510 of the first paired fuel window-air orifices 902 is distinct from a second shape of the first orifice 508 of the second paired fuel window-air orifices 904.

Figure 10:
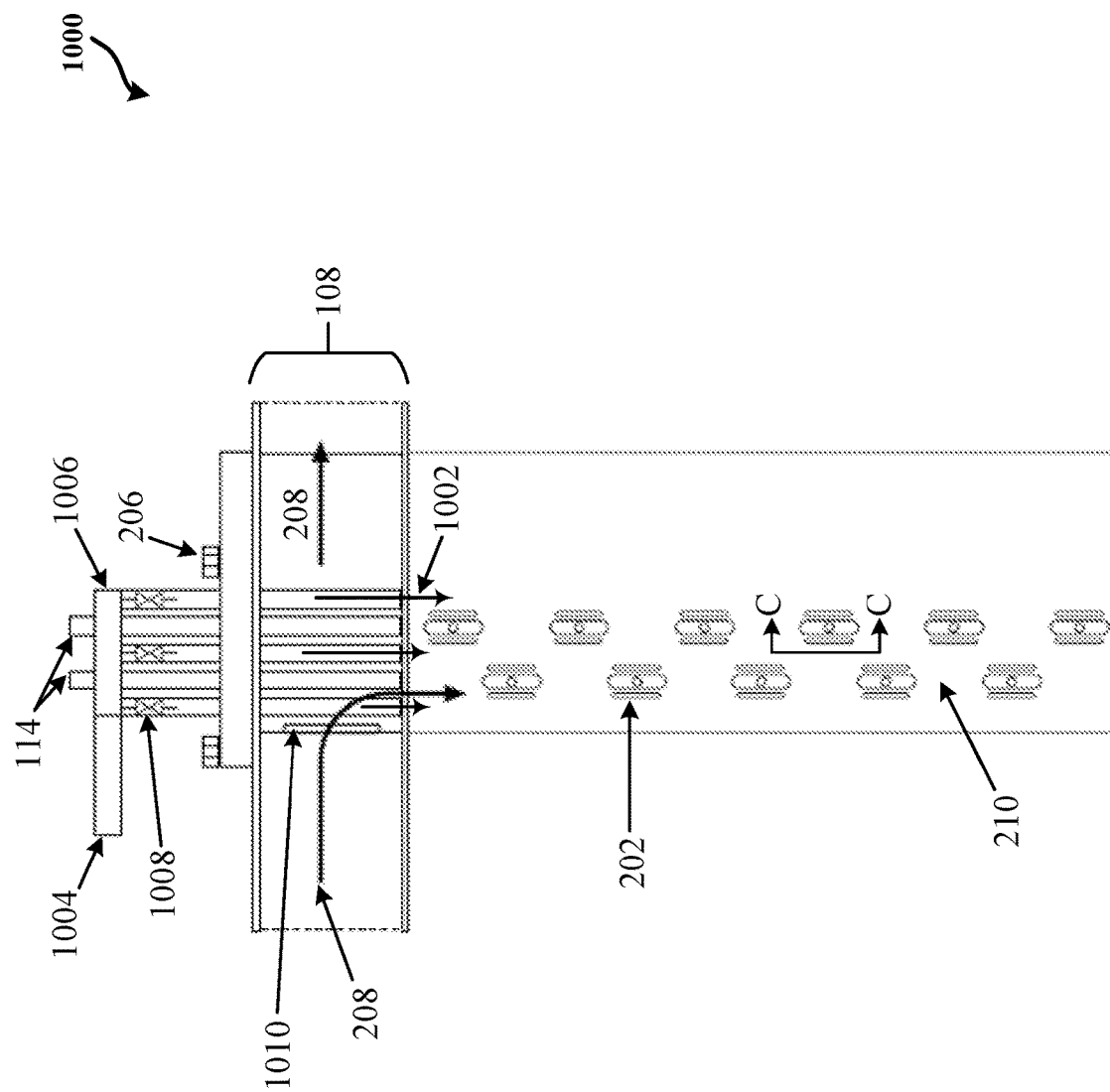
FIG. 10 is a simplified illustration of an exemplary fuel spray apparatus in accordance with some embodiments.

FIG. 10 is a simplified illustration of an exemplary fuel spray apparatus 1000 in accordance with some embodiments. In some embodiments, the fuel spray apparatus 1000 includes one or more paired fuel window-air orifices 202. In some embodiments, the fuel spray apparatus 1000 includes a heat shield body 210 integrated with the one or more paired fuel window-air orifices 202. In some embodiments, the fuel spray apparatus 1000 includes one or more fuel spray inlets 114 to receive fuel discharged by the one or more paired fuel window-air orifices 202. In some embodiments, a portion of the fuel spray apparatus 1000 is enclosed in the fan duct 108. In some embodiments, the portion of the fuel spray apparatus 1000 enclosed in the fan duct 108 includes at least one fan duct inlet 1010 to receive fan air/bypass air 208. In some embodiments, portions of the fan air/bypass air 208 flowing in the fan duct 108 enters the at least one fan duct inlet 1010 while the remaining portions of the fan air/bypass air 208 flows around/bypasses the fan duct-enclosed portion of the fuel spray apparatus 102 to continue downstream of the fan duct 108. In some embodiments, the fuel spray apparatus 1000 is secured to the fan duct 108 with one or more fasteners 206. In some embodiments, the fuel spray apparatus 1000 includes a bleed air supply pipe 1004, a bleed air manifold 1006, and/or one or more control valves 1008. In some embodiments, the bleed air supply pipe 1004 receives bleed air 1002 sourced from a compressor bleed offtake and/or elsewhere on the augmented gas turbine engine 100. In some embodiments, the bleed air from the bleed air supply pipe 1004 enters the bleed air manifold 1006 and individually directs air to each bleed air conduit 1102. The fan air/bypass air 208 flowing inside the fan duct 108 and portions of the one or more fuel spray inlets 114 and the bleed air supply pipe 1004 shown inside the fan duct 108 are depicted as visible in FIG. 10 for illustration purposes. They are enclosed by the heat shield body 210 and generally not visible. Portions of the fuel spray apparatus 1000 including the at least one fan duct inlet 1010 that are enclosed inside the fan duct 108 are depicted as visible in FIG. 10 for illustration purposes. Once the fuel spray apparatus 102 is fastened to the fan duct 108, this portion of the fuel spray apparatus 102 is generally not visible.

Figure 11:
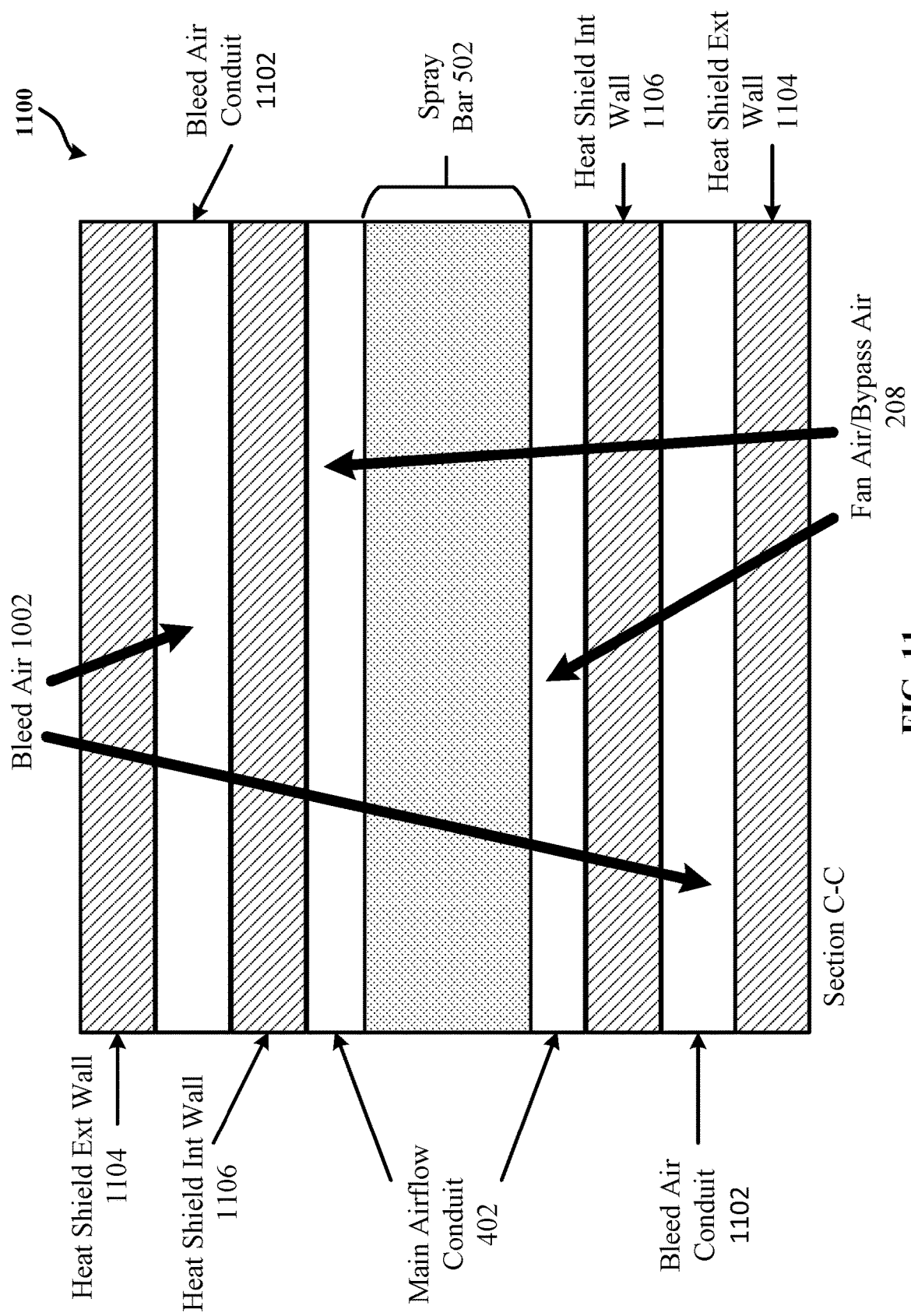
FIG. 11 is a schematic illustration of a cross-section of the exemplary fuel spray apparatus of FIG. 10 showing layer arrangements of conduits and heat shield walls in accordance with some embodiments.

To further illustrate, another illustrative non-limiting examples of one or more paired fuel window-air orifices are shown and described in FIGS. 11 and 10. FIG. 11 is a schematic illustration of a cross-section of the exemplary fuel spray apparatus 1000 of FIG. 10 showing layers of conduits and heat shield walls arrangements 1100 in accordance with some embodiments. FIG. 12 is a cross-sectional view of two exemplary paired fuel window-air orifices 1200 of an exemplary fuel spray apparatus 1000, in accordance with some embodiments. In some embodiments, a distinction between the fuel spray apparatus 102 previously described above and the fuel spray apparatus 1000 described below is the alternative source of air supplying the first airflow conduit 516, the second airflow conduit 518, the first subchannel 802, the third subchannel 804, the second subchannel 602, and/or the fourth subchannel 604.

In FIG. 11, a heat shield external wall 1104 is a top layer forming a surface and/or the heat shield body 210 of the fuel spray apparatus 1000. In some embodiments, the heat shield external wall 1104 provides protection/shielding to spray bars 502 of FIG. 12 from the temperature environment inside the augmented gas turbine engine 100. In some embodiments, the main airflow conduit 402 directs the fan air/bypass air 208 to at least partially surround a spray bar 502 of FIG. 10. In some embodiments, the spray bar 502 directs fuel to the one or more fuel apertures 504 of the fuel spray apparatus 1000. In some embodiments, the at least one fan duct inlet 1010 of FIG. 10 is an opening to the main airflow conduit 402 that receives the fan air/bypass air 208 from the fan duct 108.

In some embodiments, the air from the main airflow conduit 402 is directed to flow into an upstream gap 702 and a downstream gap 704 terminating at the fuel conduit 506. In some embodiments, the upstream gap 702 and the downstream gap 704 are formed between a heat shield internal wall 1106 and the spray bar 502 to direct the air that flows through these gaps to cooperatively impinge the fuel jet into a shape as the fuel jet comes out of the fuel injection aperture 504 to the fuel conduit 506 and out of the fuel window 520. In some embodiments, the first airflow conduit 516, the second subchannel 602, and the first subchannel 802 are grown within the heat shield internal wall 1106 and the heat shield external wall 1104 using 3D printing or additive manufacturing process. In some embodiments, the third subchannel 804, the fourth subchannel 604, and the second airflow conduit 518 are grown within the heat shield internal wall 1106 and the heat shield external wall 1104 using 3D printing or additive manufacturing process. In some embodiments, the bleed air flowing through the one or more control valves 1008 supplies each of the first airflow conduit 516, the second subchannel 602, the first subchannel 802, the third subchannel 804, the fourth subchannel 604, and the second airflow conduit 518 via the bleed air conduit 1102.

In some embodiments, the third subchannel 804 includes an oblique subchannel portion 1202 and a parallel subchannel portion 1204. In some embodiments, a centerline of the oblique subchannel portion 1202 is at an oblique angle relative to the second centerline 526 of the fuel conduit 506. In some embodiments, the oblique subchannel portion 1202 terminates at a distal end 1206 of the parallel subchannel portion 1204. In some embodiments, the parallel subchannel portion 1204 terminates at the second orifice 510. In some embodiments, a centerline of the parallel subchannel portion 1204 is parallel relative to the second centerline 526 of the fuel conduit 506.

The inventive subject matter is not limited to the specific aspects described and illustrated herein. Different aspects and adaptations besides those shown herein and described, as well as many variations, modifications and equivalent arrangements will now be apparent or will be reasonably suggested by the foregoing specification and drawings, without departing from the substance or scope of the inventive subject matter.

This written description uses examples to describe aspects of the disclosure described herein, including the best mode, and also to enable any person skilled in the art to practice aspects of the disclosure, including making and using any devices or systems and performing any incorporated methods.

Further aspects of the disclosure are provided by the subject matter of the following clauses:

A fuel spray apparatus for spraying fuel in an augmented gas turbine engine including a spray bar with a fuel injection aperture to inject a fuel jet into a fuel conduit, the fuel conduit having a fuel window to discharge the fuel jet into a core exhaust flow of an augmented gas turbine engine, a first airflow conduit having a first orifice to discharge a first air stream into the core exhaust flow, and a second airflow conduit having a second orifice to discharge a second air stream into the core exhaust flow, wherein the first orifice and the second orifice are paired with the fuel window to cooperatively shape the fuel jet coming out of the fuel window.

The fuel spray apparatus of any preceding clause further includes a second spray bar with a second fuel injection aperture to inject a second fuel jet into a second fuel conduit, the second fuel conduit having a second fuel window to discharge the second fuel jet into the core exhaust flow, a third airflow conduit having a third orifice to discharge a third air stream into the core exhaust flow, and a fourth airflow conduit having a fourth orifice to discharge a fourth air stream into the core exhaust flow, wherein the third orifice and the fourth orifice are paired with the second fuel window to cooperatively shape the second fuel jet coming out of the second fuel window, wherein the first orifice is a first distance relative to the fuel window and the second orifice is a second distance relative to the fuel window, and wherein the third orifice is a third distance relative to the second fuel window and the second orifice is a fourth distance relative to the second fuel window.

The fuel spray apparatus of any preceding clause wherein the first airflow conduit splits into a first subchannel and a second subchannel, and wherein the first orifice is located at a terminal end of the first subchannel and the second subchannel terminates at a first opening into the fuel conduit.

The fuel spray apparatus of any preceding clause wherein the second airflow conduit splits into a third subchannel and a fourth subchannel, wherein the second orifice is located at a terminal end of the third subchannel and the fourth subchannel terminates at a second opening into the fuel conduit.

The fuel spray apparatus of any preceding clause wherein the first opening into the fuel conduit is positioned substantially horizontally across the second opening into the fuel conduit.

The fuel spray apparatus of any preceding clause wherein a first centerline of the first airflow conduit is at a first angle relative to a second centerline of the fuel conduit, and wherein a third centerline of the second airflow conduit is at a second angle relative to the second centerline of the fuel conduit.

The fuel spray apparatus of any preceding clause further including a main airflow conduit to direct air into the first airflow conduit and the second airflow conduit, and a heat shield wall at least partially surrounding the spray bar proximate the fuel injection aperture, wherein the air is directed to flow into a gap between the heat shield wall and the spray bar to cooperatively impinge the fuel jet into the shape as the fuel jet comes out of the fuel window and form an air curtain to shield the fuel jet from the core exhaust flow.

The fuel spray apparatus of any preceding clause wherein at least one of a first shape of the first orifice or a second shape of the second orifice comprises a circular shape.

The fuel spray apparatus of any preceding clause wherein the fuel window is approximately equidistant from both the first orifice and the second orifice.

The fuel spray apparatus of any preceding clause wherein the first orifice is positioned substantially across the second orifice relative to the fuel window.

The fuel spray apparatus of any preceding clause wherein the first airflow conduit and the second airflow conduit are configured to receive at least one of bypass air and bleed air of the augmented gas turbine engine.

A system for spraying fuel in an augmented gas turbine engine, the system including a gas turbine engine having an augmentor portion for burning fuel, and at least one fuel spray bar for spraying fuel within the augmentor portion, the at least one fuel spray bar including a first spray bar with a fuel injection aperture to inject a first fuel jet into a first fuel conduit, the first fuel conduit having a first fuel window to discharge the first fuel jet into a core exhaust flow of the augmentor portion, a first airflow conduit having a first orifice to discharge a first air stream into the core exhaust flow, and a second airflow conduit having a second orifice to discharge a second air stream into the core exhaust flow, wherein the first orifice and the second orifice are paired with the first fuel window to cooperatively shape the first fuel jet coming out of the first fuel window.

The fuel spray apparatus of any preceding clause wherein the at least one fuel spray bar further including a second spray bar with a second fuel injection aperture to inject a second fuel jet into a second fuel conduit, the second fuel conduit having a second fuel window to discharge the second fuel jet into the core exhaust flow, a third airflow conduit having a third orifice to discharge a third air stream into the core exhaust flow, and a fourth airflow conduit having a fourth orifice to discharge a fourth air stream into the core exhaust flow, wherein the third orifice and the fourth orifice are paired with the second fuel window to cooperatively shape the second fuel jet coming out of the second fuel window, wherein the first orifice is a first distance relative to the fuel window and the second orifice is a second distance relative to the fuel window, and wherein the third orifice is a third distance relative to the second fuel window and the second orifice is a fourth distance relative to the second fuel window.

The fuel spray apparatus of any preceding clause wherein the third orifice is adjacent to the second orifice, the second orifice configured to discharge the second air stream at a first angular range and the third orifice configured to discharge the third air stream at a second angular range different from the first angular range.

The fuel spray apparatus of any preceding clause wherein the third orifice is adjacent to the second orifice, and wherein a first shape of the second orifice is distinct from a second shape of the third orifice.

The fuel spray apparatus of any preceding clause wherein the first orifice is located on an upstream side of the fuel window relative to the core exhaust flow, and wherein the second orifice is located on a downstream side of the fuel window relative to the core exhaust flow.

A method for spraying fuel in an augmented gas turbine engine including directing a fuel jet into a core exhaust flow of an augmented gas turbine engine via a fuel window of a fuel conduit configured to receive the fuel jet from a fuel injection aperture of a spray bar, directing a first air stream into the core exhaust flow via a first orifice of a first airflow conduit, and directing a second air stream into the core exhaust flow via a second orifice of a second airflow conduit, wherein the first air stream and the second air stream cooperatively impinge the fuel jet into a shape as the fuel jet comes out of the fuel window.

The fuel spray apparatus of any preceding clause further including directing a third air stream via a subchannel of the first airflow conduit through a first opening into the fuel conduit to impinge on the fuel jet as the fuel jet comes out of the fuel injection aperture.

The fuel spray apparatus of any preceding clause further including directing a fourth air stream via a subchannel of the second airflow conduit through a second opening into the fuel conduit to additionally impinge on the fuel jet as the fuel jet comes out of the fuel injection aperture.

The fuel spray apparatus of any preceding clause further including directing at least one of bypass air or bleed air of the augmented gas turbine engine into the first airflow conduit and the second airflow conduit.

What is claimed is:

1. A fuel spray apparatus for spraying fuel in an augmented gas turbine engine, the fuel spray apparatus comprising:
   a spray bar with a fuel injection aperture configured to inject a fuel jet into a fuel conduit;
   the fuel conduit having a fuel window to discharge the fuel jet into a core exhaust flow of the augmented gas turbine engine;
   a first channel directing a first air stream into the fuel conduit; and
   a second channel directing a second air stream into the fuel conduit, wherein the first air stream and the second air stream cooperatively shape the fuel jet coming out of the fuel window.

2. The fuel spray apparatus of claim 1, wherein the first channel corresponds to a first airflow conduit having a first orifice that discharges the first air stream into the fuel conduit, and wherein the second channel corresponds to a second airflow conduit having a second orifice that discharges the second air stream into the fuel conduit.

3. The fuel spray apparatus of claim 2, wherein the first orifice is positioned substantially horizontally across the second orifice.

4. The fuel spray apparatus of claim 1, wherein a first centerline of the first channel is at a first angle relative to a second centerline of the fuel conduit, and wherein a third centerline of the second channel is at a second angle relative to the second centerline of the fuel conduit.

5. The fuel spray apparatus of claim 1, further comprising:
   a main airflow conduit to direct air into the first channel and the second channel; and
   a heat shield wall at least partially surrounding the spray bar proximate the fuel injection aperture, wherein the air is directed to flow into a gap between the heat shield wall and the spray bar to cooperatively impinge the fuel jet into the shape as the fuel jet comes out of the fuel window and form an air curtain to shield the fuel jet from the core exhaust flow.

6. The fuel spray apparatus of claim 1, wherein the first channel and the second channel are configured to receive at least one of bypass air or bleed air of the augmented gas turbine engine.

7. The fuel spray apparatus of claim 1, wherein the first channel corresponds to a first gap formed between a heat shield wall and the spray bar, and wherein the second channel corresponds to a second gap formed between the heat shield wall and the spray bar.

8. The fuel spray apparatus of claim 1, further comprising:
   a first airflow conduit having a first orifice to discharge a third air stream into the core exhaust flow; and
   a second airflow conduit having a second orifice to discharge a fourth air stream into the core exhaust flow, wherein the first orifice and the second orifice are paired with the fuel window to cooperatively shape the fuel jet coming out of the fuel window.

9. The fuel spray apparatus of claim 8, wherein the first orifice is positioned substantially across the second orifice relative to the fuel window.

10. The fuel spray apparatus of claim 8, wherein at least one of a first shape of the first orifice or a second shape of the second orifice comprises a circular shape.

11. The fuel spray apparatus of claim 8, wherein the fuel window is approximately equidistant from both the first orifice and the second orifice.

12. The fuel spray apparatus of claim 1, wherein the first channel and the second channel are paired with the fuel window to cooperatively shape the fuel jet coming out of the fuel window.

13. The fuel spray apparatus of claim 1, further comprising:
   a second spray bar with a second fuel injection aperture to inject a second fuel jet into a second fuel conduit;
   the second fuel conduit having a second fuel window to discharge the second fuel jet into the core exhaust flow;
   a third channel directing a third air stream into the second fuel conduit; and
   a fourth channel directing a fourth air stream into the second fuel conduit, wherein the third channel and the fourth channel are paired with the second fuel window to cooperatively shape the second fuel jet coming out of the second fuel window.

14. A system for spraying fuel in an augmented gas turbine engine, the system comprising:
   a gas turbine engine having an augmentor portion for burning the fuel; and
   at least one fuel spray bar for spraying the fuel within the augmentor portion, the at least one fuel spray bar comprising:
      a first spray bar with a fuel injection aperture to inject a fuel jet into a fuel conduit;
      the fuel conduit having a fuel window to discharge the fuel jet into a core exhaust flow of the augmented gas turbine engine;
      a first channel directing a first air stream into the fuel conduit; and
      a second channel directing a second air stream into the fuel conduit, wherein the first air stream and the second air stream cooperatively shape the fuel jet coming out of the fuel window.

15. The system of claim 14, wherein the at least one fuel spray bar further comprises:
   a second spray bar with a second fuel injection aperture to inject a second fuel jet into a second fuel conduit;
   the second fuel conduit having a second fuel window to discharge the second fuel jet into the core exhaust flow;
   a third channel directing a third air stream into the second fuel conduit; and
   a fourth channel directing a fourth air stream into the second fuel conduit, wherein the third channel and the fourth channel are paired with the second fuel window to cooperatively shape the second fuel jet coming out of the second fuel window.

16. The system of claim 14, wherein the first channel is adjacent to the second channel, the second channel configured to discharge the second air stream at a first angular range and the first channel configured to discharge the first air stream at a second angular range different from the first angular range.

17. The system of claim 14, wherein the first channel corresponds to a first airflow conduit having a first orifice that discharges the first air stream into the fuel conduit, and wherein the second channel corresponds to a second airflow conduit having a second orifice that discharges the second air stream into the fuel conduit.

18. The system of claim 14, wherein the first channel and the second channel are paired with the fuel window to cooperatively shape the fuel jet coming out of the fuel window.

19. The system of claim 14, wherein the first channel corresponds to a first gap formed between a heat shield wall and the at least one fuel spray bar, and wherein the second channel corresponds to a second gap formed between the heat shield wall and the at least one fuel spray bar.

20. A method for spraying fuel in an augmented gas turbine engine comprising:
- directing a fuel jet into a core exhaust flow of the augmented gas turbine engine via a fuel window of a fuel conduit configured to receive the fuel jet from a fuel injection aperture of a spray bar;
- directing a first air stream into the fuel conduit; and
- directing a second air stream into the fuel conduit, wherein the first air stream and the second air stream cooperatively shape the fuel jet coming out of the fuel window.

\* \* \* \* \*